United States Patent [19]

Egy

[11] Patent Number: 4,826,077
[45] Date of Patent: May 2, 1989

[54] EMERGENCY TRACTION DEVICE FOR VEHICLES

[76] Inventor: Michael J. Egy, 1415 N. 8th St., Terre Haute, Ind. 47807

[21] Appl. No.: 131,423

[22] Filed: Dec. 7, 1987

[51] Int. Cl.$^4$ .............................................. E01B 23/00
[52] U.S. Cl. ...................................................... 238/14
[58] Field of Search ................. 238/14, 10 R; 106/13; 291/1, 2

[56] References Cited

U.S. PATENT DOCUMENTS

| | | | |
|---|---|---|---|
| 1,468,023 | 9/1983 | Johnson | 238/14 |
| 3,202,358 | 8/1965 | Griswold | 238/14 |
| 3,708,117 | 1/1973 | Coale | 238/14 |
| 3,836,075 | 9/1974 | Botbol | 238/14 |
| 4,121,765 | 10/1978 | Fostens | 238/14 |
| 4,223,835 | 9/1980 | Witt et al. | 238/14 |
| 4,281,791 | 8/1981 | Schaaf et al. | 238/14 |
| 4,294,405 | 10/1981 | Ross | 238/14 |
| 4,374,743 | 2/1983 | Stockel | 252/70 |
| 4,650,115 | 3/1987 | Fontaine | 238/14 |

FOREIGN PATENT DOCUMENTS 715939  8/1965  Canada .................................. 238/14

Primary Examiner—Andres Kashnikow
Assistant Examiner—Mark T. Le
Attorney, Agent, or Firm—H. John Barnett

[57] ABSTRACT

An emergency traction device for vehicles which comprises a particulate traction material, such as sand, held together by a suitable binder material, such as sodium silicate, to provide an easily handled and stored article. The article may take the form of a flat, sheetlike, rectangular block, and may have gridlike, briquet sections therein, which can be broken off in one or more sections from the main block for use in lesser quantities. In another embodiment, the article may comprise a discrete briquet. To provide traction for a vehicle stuck on ice or snow, the flat, rectangular block, or the briquet sections, or the discrete briquets are placed in contact with the slipping drive wheel of a stuck vehicle in line with the desired direction of travel. Rotation of the drive wheel tire in contact with the traction device causes the traction device to be ground into traction-producing materials which spread under the drive wheel to improve traction.

17 Claims, 4 Drawing Sheets

EMERGENCY TRACTION DEVICE FOR VEHICLES

BACKGROUND OF THE INVENTION

1. Field of the Invention

This invention is directed to an emergency traction device for vehicles which comprises a traction material such as sand formed into a flat, sheetlike rectangular block held together with a suitable binder. The device is placed in front or back of a wheel of a vehicle which is stuck on ice or snow, or other slippery surface where improved traction is needed. The rotation of the tire in contact with the device causes it to be ground into traction-producing material which spreads under the tire to improve traction.

2. Description of the Related Art

U.S. Pat. No. 4,231,791 issued to Schaaf et al shows a traction device comprising a plastic bag containing sand, and having a foam or sponge rubber pad on one side. Rotation of the adjacent vehicle wheel is said to cause the bag to rupture and spread sand under the wheel. This device leaves fragments of the plastic bag and the foam or sponge on the roadway, creating non-biodegradable litter. Efforts to retrieve all the fragments and pieces under adverse winter conditions would create a serious inconvenience, and the litter would probably be left on the roadway to enter and clog storm sewer systems. The only residue left using the subject invention is sand and a completely biodegradable, water soluble binder, neither of which create serious environmental problems.

A number of other patents are directed to traction devices for vehicles, but all of these are nondestructible articles intended for re-use. The following patents are typical of such reusable traction devices:

| | | |
|---|---|---|
| Johnson | 1,468,023 | 1923 |
| Griswold | 3,202,358 | 1965 |
| Coale | 3,708,117 | 1973 |
| Botbol | 3,836,075 | 1974 |
| Fosteris | 4,121,765 | 1978 |
| Witt et al | 4,223,835 | 1980 |
| Fontaine | 4,650,115 | 1987. |

Johnson's traction plate is composed of sheet steel, and would be expensive to manufacture, and difficult to handle, since it is relatively long and heavy, and it is rigid. Griswold's traction pad is a sheet of rubberized cloth in pad form which has been coated with a flexible layer of rubber or plactic and embedded abrasive. Coale is similar to this, but includes a smooth-bottom tongue for easy insertion under a vehicle wheel. All of the above patents require that the vehicle operator, or some other person, recover the traction devices after each use, which would usually require stopping, and possibly getting stuck a second time.

Botbol is directed to a series of metal plates which are locked together to provide a longer than normal traction path. The Botbol device appears to be complex and expensive to manufacture. Fosteris describes an ice mat made of a flexible rubber-like material, and includes elongated metal strips imbedded in the mat, and rib members extending transversely across the mat and riveted to it. Also included in the Fosteris device are ice gripping elements on the bottom of the mat. This device would also be relatively expensive to manufacture, and appears to be somewhat clumsy to handle, and to store for re-use. Accumulated mud, ice and snow would have to be removed before replacing it in the vehicle, an unlikely step in cold, snowy and icy weather.

Both Witt and Fontaine are directed to traction devices similar in general principles to those described above. Witt's traction-type pad includes a metal "starter plate" which would add to the manufacturing cost. Fontaine's traction mat is almost like a giant, flexible metal watchband, which would, again, be very expensive to manufacture, and would be difficult to keep clean between uses, since it has many cavities and parts in which mud, snow and ice can lodge.

The subject invention eliminates all of the above problems. It is not necessary to get stuck a second time by stopping to recover the traction device of this invention after use. The materials of this invention are environmentally acceptable, and no litter is left behind on the roadway, such as is the case with the Schaaf et al device, which appears to leave fragments of the plastic bag and sponge or foam, unless the vehicle operator stops again to recover these.

SUMMARY OF THE INVENTION

This invention provides a simple traction device made of sand, or other readily available traction material, bounded together by a binder, such as sodium silicate, which is water soluble and will not harm the roadways or the environment by its emergency use on winter roadways. The traction device of this invention is easily carried, and conveniently packaged and stored in the user's vehicle, with use instructions printed on the package.

When a vehicle is stuck, the gear shift is put in "park", or "neutral" so the wheels are stationary. The traction device is removed from its package, taking care to keep the packaging material to dispose of properly. The traction device is then wedged against the wheel which has been slipping on the side towards the desired direction of travel. If more than one wheel has been slipping, a second traction device may be wedged against the leading edge of that wheel at the same time to double the traction. Under really severe conditions, a series of traction devices may be placed along the anticipated path of travel of the vehicle to ensure enough traction to free the vehicle. After the traction device, or devices, have been been placed in position, the vehicle is then put in gear to cause the slipping wheels to turn down toward the respective traction devices, thereby breaking off the contacting edges, and pulling the fragments thereby released down under the repective wheel to provide traction. As the traction increases, more of the traction device is broken away and pulled down under the wheel to further improve traction, and move the vehicle forward or backward to free it from the stuck condition.

DESCRIPTION OF THE PREFERRED EMBODIMENT

Figure 1:
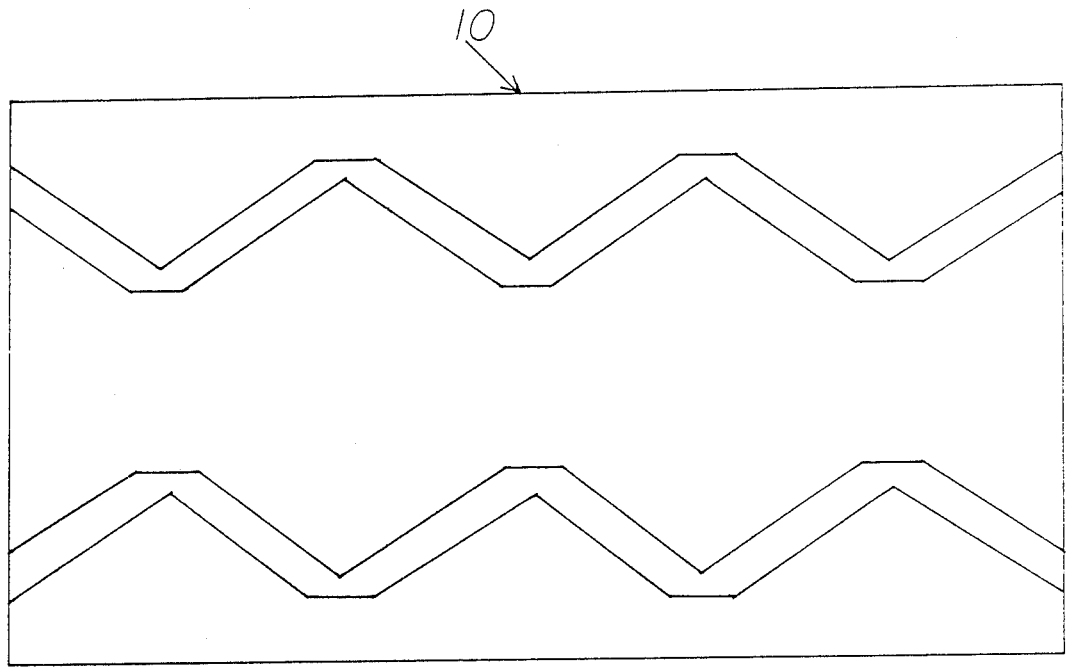
FIG. 1 is a top plan view in general outline of a traction device of the invention, showing a recessed design which may be formed in the device at the time of manufacture.

As shown in the drawings, a traction device 10 is generally a flat, sheetlike rectangular shape of suitable length and volume to provide sufficient traction material to effectively move the vehicle out of a stuck condition. The width of the traction device 10 is generally determined by the intended application and the expected tire width. For example, a device intended for use with subcompact sized automobile tires would be relatively smaller in all dimensions than one intended for use with a semi-trailer tractor tire.

FIG. 1 shows a design 11 formed in the surface of the traction device 10. This design can take any desired shape, and may be included for informational as well as for functional purposes to improve the shredding action under the rotating vehicle wheel. It is contemplated that the design 11 can be omitted entirely without decreasing the effectiveness of the traction device 10.

Figure 2:
FIG. 2 is a side sectional view of the device shown in FIG. 1, taken along line 2—2 of FIG. 1.

FIG. 2 of the drawings shows the generally particulate makeup of the traction device 10, which comprises small particles 12 bound together in a rigid matrix, by a suitable binder. In the presently preferred embodiment of the invention, the particles 12 comprise sand. River sand is the least expensive, and would therefore be used because it provides excellent traction. The presently preferred binder for the sand particles 12 is sodium silicate, also known as waterglass. Sodium silicate does not add any harmful or toxic chemicals to the environment, and it readily breaks up when the traction device 10 is used to free a stuck vehicle.

Figure 3:
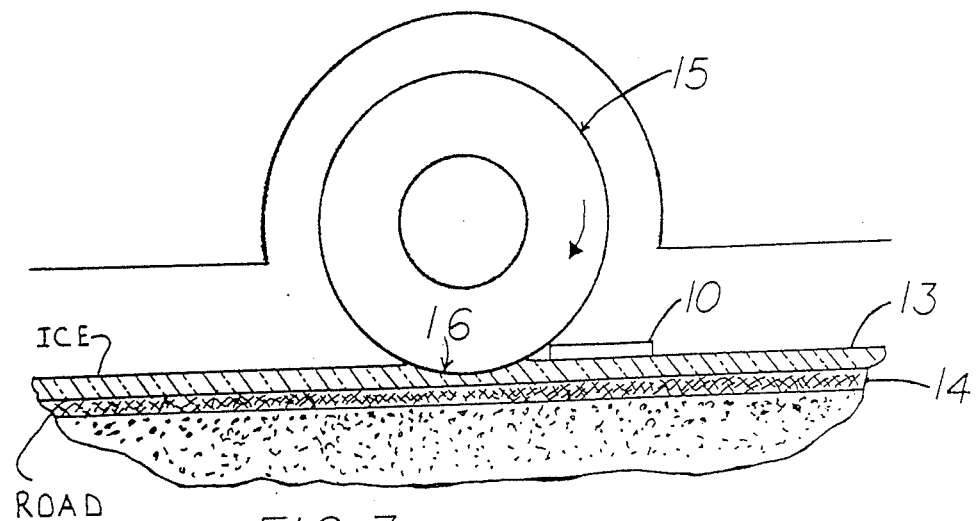
FIG. 3 is a side schematic view of a vehicle wheel resting on an ice-covered roadway, the ice and the roadway being shown in section, and with the traction device in position to provide traction to the wheel.

FIG. 3 of the drawings shows a road film of ice 13 over a roadway 14 with a vehicle wheel 15 of a vehicle (not shown) stuck thereon. The spinning of the vehicle wheel 15 has caused a depression 16 in the ice 13. As the depression 16 deepens, it becomes more difficult to free the vehicle, because of the ever-increasing steep angle of the depression 16.

To efficiently free the vehicle, the traction device 10 is placed in contact with the wheel 15 on the leading edge thereof, that is, in the direction of the desired travel, which is determined by the road or surface conditions ahead or behind the vehicle. Placing of the traction device 10 in contact with the wheel 15 is preferably done while the wheel is not rotating, but it can also be done while the wheel is rotating, preferably at a very low r.p.m.

Figure 4:
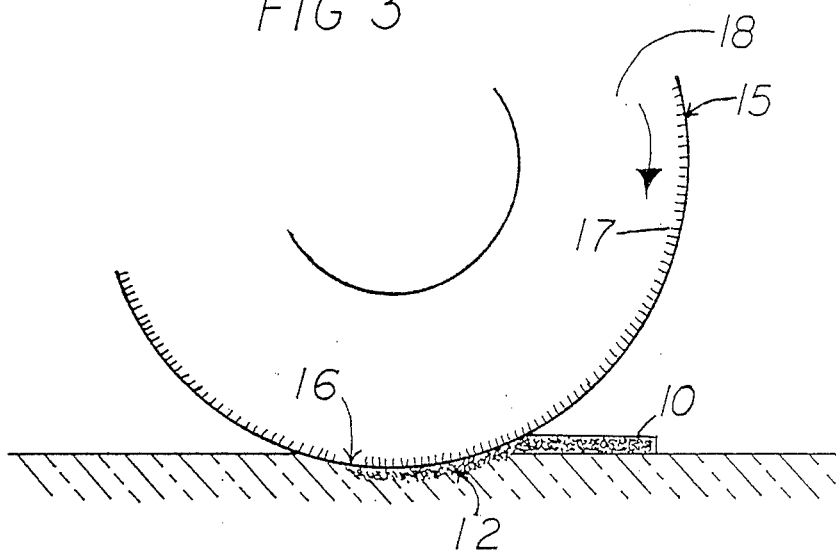
FIG. 4 is an enlarged view of a portion of FIG. 3 showing the co-operative action of the wheel and the traction device in spreading the traction material under the wheel. The grinding action of the tire tread on the traction device is shown in particular.
Figure 5:
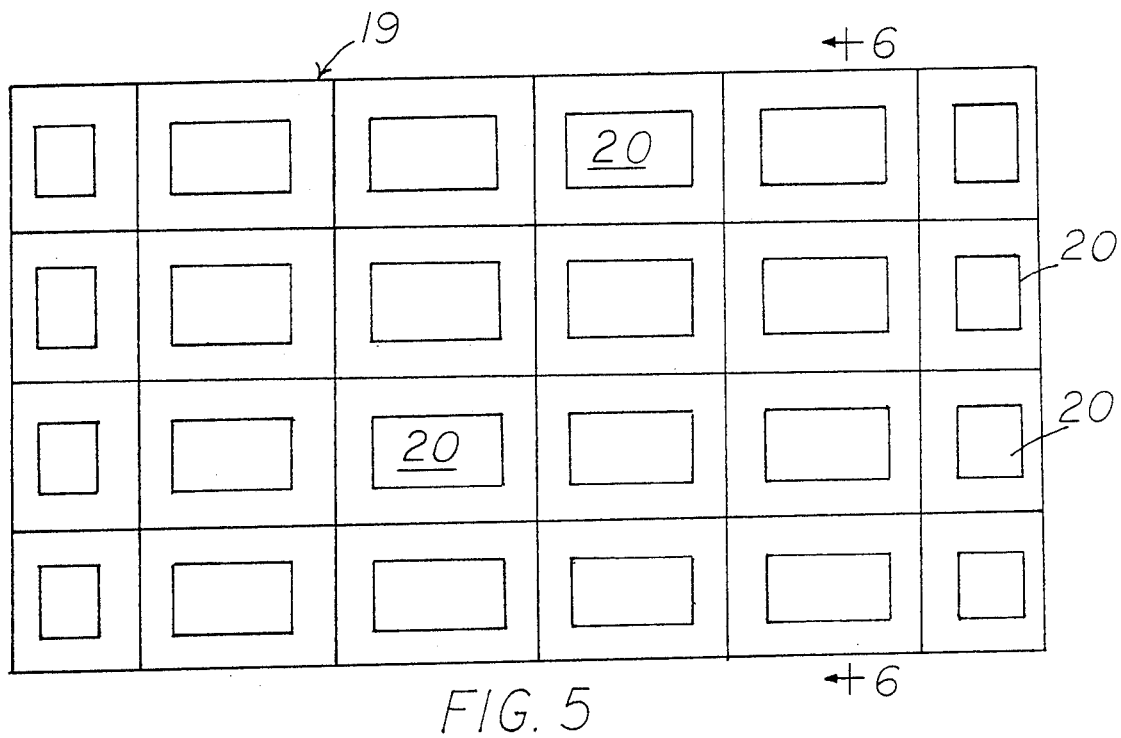
FIG. 5 is a top plan view of another embodiment of the invention, showing a sheetlike device formed into briquets, which may be employed as a single unit, or individual briquets may be broken off.

As best shown in FIG. 4, the wheel 15 is then caused to rotate downwardly towards the traction device 10 at a relatively low r.p.m. This causes the tread surface 17 of the tire 18 on wheel 15 to bite into the traction device 10, thereby breaking off particles 12 (sand, or other particulate traction material) and distributing the particles 12 on the ice 13 in the depression 16, and under the wheel 15, to greatly improve traction of the wheel 15, and enable it to "walk out" of the depression 16, thereby freeing the vehicle from its stuck condition.

A plurality of traction devices 10 can be used as necessary if more than one driving wheel 15 is stuck and spinning on the ice 13. The traction device 10 will also function under a non-driving wheel to prevent sideways motion by that end of the vehicle as traction is being established under the driving wheels.

Figure 6:
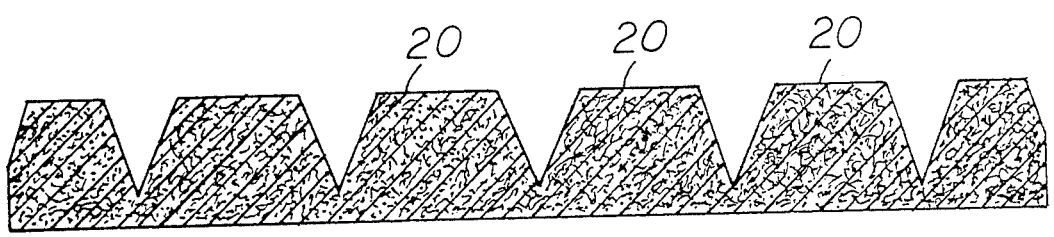
FIG. 6 is a side sectional view taken along line 6—6 of FIG. 5 to show one form of briquets which may be employed, and which break off easily from the sheetlike device shown in FIG. 5.

In the embodiment shown in FIGS. 5-8, the emergency traction device of the invention is formed into a sheetlike wafer or flat rectangular block 19 comprising a plurality of briquet sections 20 formed therein, shown in cross section in FIG. 6. The block 19 can be used in the manner described above for the device 10, or the briquet sections 20 can be broken off from the block 19 and used in a smaller quantity.

Figure 7:
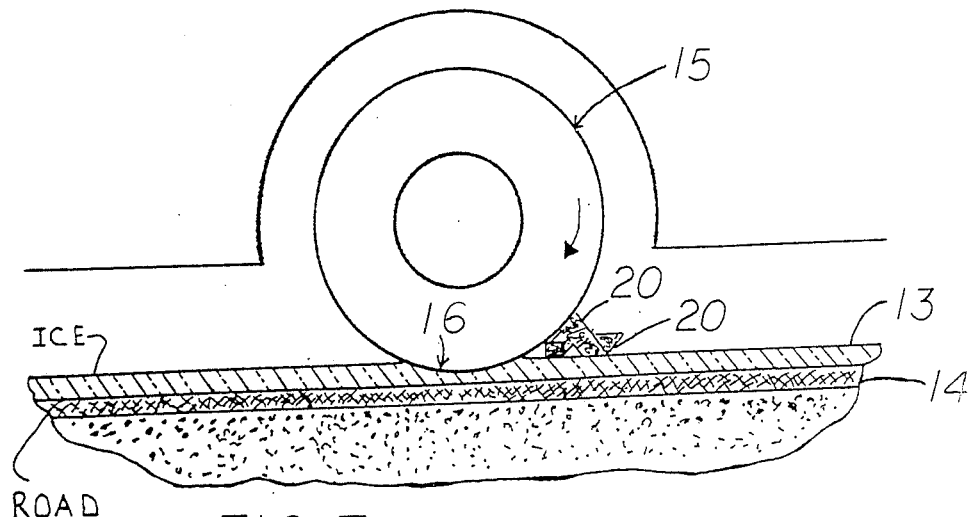
FIG. 7 is a side schematic view similar to FIG. 3, but showing a plurality of briquets placed in position to provide traction to the wheel.
Figure 8:
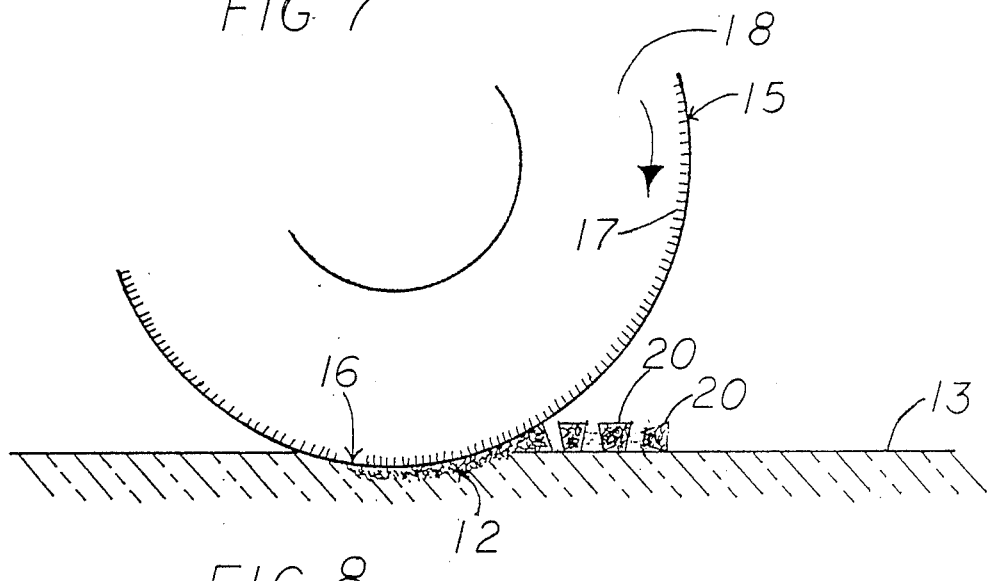
FIG. 8 is an enlarged portion of FIG. 7 and is similar to FIG. 4 showing the co-operative action of the wheel and the plurality of discrete briquets of FIG. 7 in spreading the traction material under the wheel.

As best seen in FIG. 7, the discrete briquet sections 20 are placed under the leading edge of a vehicle wheel 15 and, as the wheel 15 turns, the briquet sections 20 are ground into traction material, which moves under the wheel 15 to provide traction, in a manner similar to that described above in connection with the traction device 10.

METHOD OF MAKING THE DEVICE

The traction device of the invention can be made using modifications of conventional foundry core sand mold-forming methods which are well known. The most important modifications of the foundry core sand mold-forming method are dictated by the relatively simple shape of the traction device 10, which is a generally flat, sheetlike, rectangular shape comprising core sand material held together by a suitable binder. The following example illustrates a presently preferred method of making the traction device 10.

EXAMPLE 1

A measured amount of sand is mixed with a measured amount of sodium silicate binder at a ratio of about 99 parts sand to one parts sodium silicate binder. The sand is placed in a muller, and the binding agent is added while the muller is operating. The mixture is mulled for about ten minutes. Then catalyst is added, and the mixture is mulled for an additional 7-10 minutes. The "mossy" mixture is then removed from the muller and placed in a form or mold, and allowed to set for about 25 minutes, or until the product is set. The set, formed product is then removed from the molds and packaged for sale and use as an emergency traction device.

Other traction materials which may be used, either alone, or in combination with sand, include: inert granular materials, gravel, coal cinders, sawdust, wood chips, wood particles and various granular mineral materials, including salts which melt ice, such as rock salt, sodium chloride, calcium chloride, and combinations thereof. Other binder materials which may be used either separately, or in combination with sodium silicate include: thermosetting resins, thermoplastic resins, inorganic salts, organic salts, and generally any binder which is functional with the traction material, or combinations of traction materials. As mentioned above, the presently preferred materials are those which will be most compatible with the environment. Where environmental considerations are not required, the other materials could be used. The important requirement is that the traction device be capable of disintegrating when placed in contact with a rotating vehicle wheel to disperse the granular traction material under the vehicle wheel to thereby improve traction.

EXAMPLE 2

In another embodiment, a measured amount of sand or other granular material is mixed with a measured amount of sodium silicate binder material in the ratio of about 90-99 parts granular material to about 1-10 parts binder material. Other granular materials contemplated include granular minerals, combustion products, vegetable and animal materials. The sodium silicate binder material is commonly referred to as "water glass", and is an hydratable mixture of the oxides of sodium and silica. It is a colorless, odorless liquid which is appreciably soluble in water, has a boiling point of about 212 Deg. Fahrenheit, a vapor pressure of about 24 mm Hg at 25 Deg. Centigrade, a melting point of about 70-80 Deg. Fahrenheit, and specific gravity in the range of 1.39 to 1.72. This binder material does not burn, and although gloves and goggles are required when handling it, it creates no substantial enviromental or health hazard as used in the product. This sodium silicate binder material is available from American Colloid Company, Skokie, Ill.

The catalyst material of this embodiment is a mixture of glyceryl acetates having a boiling point in the range of 120-148 Deg. Centigrade, a Specific Gravity of about 1.16, a vapor pressure of about 760 mm Hg, and a Flash Point of about 290 Deg. Centigrade. It is a clear, odor-free liquid having substantial water solubility, and although gloves and goggles are required for handling during the manufacturing process, its use in the product creates no significant environmental or health hazard. This catalyst material is available from American Colloid Company, Skokie, Ill.

The above described catalyst is added to the mixture of sand and sodium silicate binding agent after first mulling for about ten minutes as per Example 1. The quantity of catalyst added is generally about one parts per 100 parts of sand/binder mixture.

EXAMPLE 3

In another embodiment, a carbon dioxide gas cured binding system is employed. A mixture of foundry resins and binders and granular material is mulled together in the proportions and using the general procedure of Example 1 above. Carbon dioxide gas is then shot through the mixture of binder and granular material to cure it. The process of mixing is similar to that used in forming of sand cores in foundry casting practice, with two important differences. The shape to which the traction device of the invention is formed is substantially flat to make it most useful under a vehicle wheel, and the combination of traction and binder materials is the final product. The mold in which the binder/granular material mixture is formed determines its shape. Except for the shape of the molds, the forming methods are well known in the sand core molding art.

The traction device of the invention may also be formed as a flat, rectangular block, having grid-like briquet sections therein. These sections can be broken off in one or more sections for use in lesser quantities. In another embodiment, the article may comprise discrete briquets which may be packaged in suitable bags or containers, similar to charcoal briquets or other granular, pelleted products. The briquets or pellets are placed next to the leading edge of the vehicle wheel in line with the desired direction of travel to provide traction action substantially as described above.

In yet another embodiment, a waffle-like pattern may be formed into the flat, rectangular form of the traction device. The waffle-like pattern provides an irregular surface for the vehicle tire to bite into.

At present, the preferred traction material is a silica sand having a particle size in the range of 160-220 mesh. Such a sand is available from Ottawa Shot, Ltd., Ottawa, Ill. Other useful sands include river, desert and lake sands in their natural size ranges, and preferably washed and clean. Certain salts can be used in combination with the sand to further improve the traction obtainable when the salt selected either melts or pits the slippery surface, or in some other way converts it to a less slippery surface.

I claim:

1. A traction device for vehicles useful for improving the traction of a vehicle on a slippery road surface, said traction device comprising:
    a traction material consisting essentially of a granular material which improves traction when disposed under the drive wheels of a vehicle; and
    a binder material intimately distributed throughout said traction material for binding and shaping the individual granules of said traction material into a self-supporting structure having no external container, but which allows the traction device to disintegrate when placed under the leading edge of a drive wheel of a vehicle which is stuck on a slippery road surface, and when the vehicle operator causes said drive wheel to rotate against the traction device, thereby causing the traction device to disintegrate and causing the traction material to move under the drive wheel and improve traction on the slippery road surface.

2. The traction device of claim 1, in which the traction material is sand and the binder material is sodium silicate.

3. The traction device of claim 1, in which the binder material is selected from the group consisting of sodium silicate, thermosetting resins, thermoplastic resins, inorganic salts, organic salts, and combinations thereof.

4. The traction device of claim 1, in which the device is formed to have a flat, sheet-like, elongated, rectangular shape to improve disintegration of the traction device.

5. The traction device of claim 1, in which the traction material is selected from the group consisting of sand, gravel, coal cinders, sawdust, wood particles, and combinations thereof, said device being adapted to be inserted between a vehicle wheel and the slippery road surface on the leading edge thereof in the direction of desired travel, whereby rotation of the wheel toward the road surface against the traction device causes the traction device to gradually disintegrate, pulling the traction material under the wheel to improve traction.

6. The traction device of claim 1, comprising briquets adapted to be used as one or several briquets.

7. The traction device of claim 1, in which the traction material comprises a combination of an inert granular material and a salt.

8. A disposable traction device for vehicles comprising:
- a traction material consisting essentially of materials selected from the group consisting of sand, gravel, granular minerals, granular combustion products, granular inert materials, granular vegetable materials and combinations thereof; and
- a binder material homogeneously distributed throughout said traction material for holding said traction material in a self-supporting flat, sheet-like shape in which the traction material is exposed at the outer surface and throughout said device, said device being adapted to be wedged under the leading edge of a driving wheel of a vehicle to be progressively broken up and to be pulled under the wheel to provide traction when the drive wheel is rotated against the traction device.

9. The traction device of claim 8, including as a catalyst material for curing the binder material: a mixture of glyceryl acetates having no substantial environmental or health hazard, said mixture having a boiling point in the range 120–248 Deg. Centigrade, a Specific Gravity of about 1.16, a vapor pressure of about 76 mm Hg., said mixture being a clear, odor-free liquid having substantial water solubility and a flash point of about 290 Deg. Centigrade.

10. The traction device of claim 9, in which the traction material is sand.

11. The traction device of claim 8, comprising briquet sections adapted to be used as one or several bricquets.

12. The traction device of claim 8, in which the traction material comprises a combination of an inert granular material and a salt.

13. A disposable traction device for vehicles comprising:
- a traction material consisting essentially of materials selected from the group consisting of sand, gravel, granular minerals, granular combustion product, granular inert materials, granular vegetable materials and combinations thereof,
- a binder material homogeneously distributed throughout said traction material for holding said traction material in a self-supporting flat, sheet-like shape in which the traction material is exposed at the outer surface and throughout said device; and
- a catalyst material for curing the binder material comprising: a mixture of glyceryl acetates having no substantial environmental or health hazard, said mixture having a boiling point in the range 120–248 Deg. Centigrade, a Specific Gravity of about 1.16, a vapor pressure of about 760 mm Hg., said mixture being a clear, odor-free liquid having substantial water solubility and a flash point of about 290 Deg. Centigrade.

14. The traction device of claim 13, in which the traction material is sand.

15. The traction device of claim 13, in which the binder material is sodium silicate.

16. A traction device for vehicles useful for improving the traction of a vehicle on a slippery road surface, said traction device comprising:
- a traction material consisting essentially of a granular material which improves traction when disposed under the drive wheels of a vehicle; and
- a binder material selected from the group consisting of sodium silicate, thermosetting resins, thermoplastic resins, inorganic salts, organic salts, and combinations thereof, said binder material being intimately distributed throughout said traction material for binding and shaping the individual granules of said traction material into a self-supporting structure having no external container, said binder material allowing the traction device to disintegrate.

17. The traction device of claim 16, in which the traction material is sand and the binder material is sodium silicate.

* * * * *